Dec. 7, 1948.   C. T. KERN   2,455,498
STEAM INJECTION TYPE WATER HEATER
Filed Jan. 11, 1945   2 Sheets-Sheet 1

Inventor:
Clarence T. Kern,
By Dunning & Dunning
Attorneys

Dec. 7, 1948.                C. T. KERN                2,455,498
                    STEAM INJECTION TYPE WATER HEATER
Filed Jan. 11, 1945                                 2 Sheets-Sheet 2
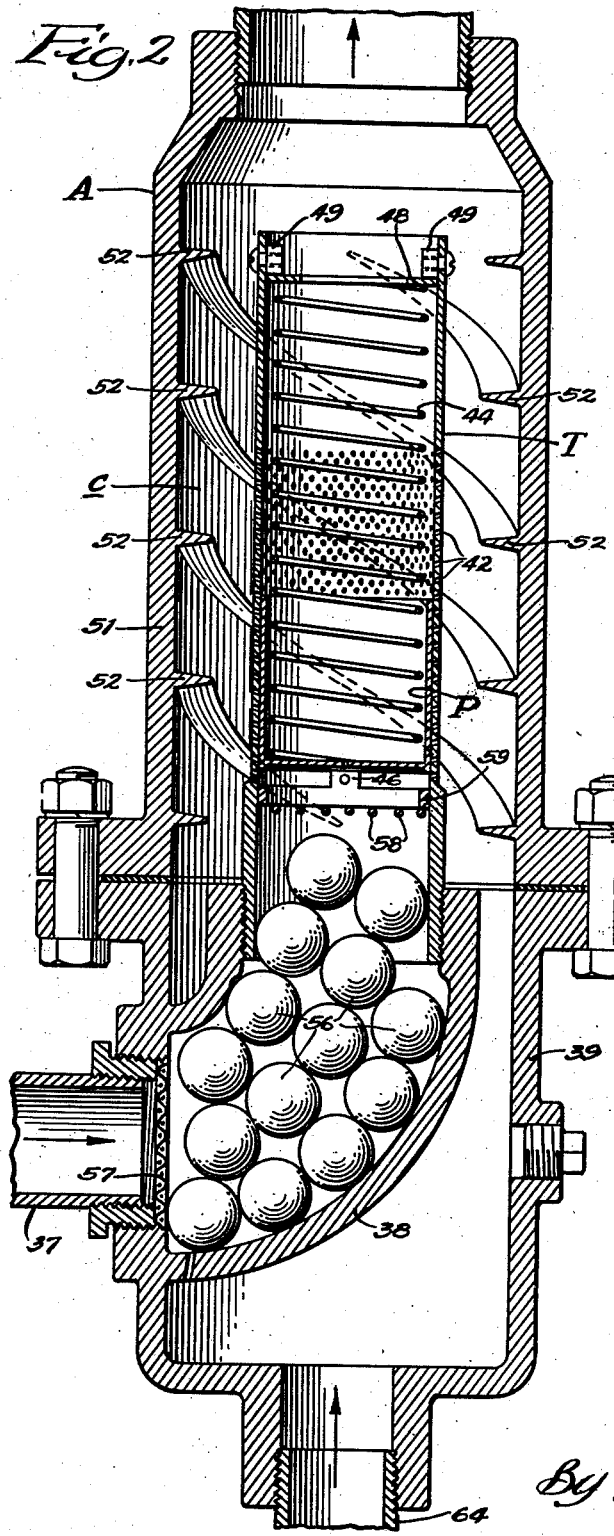
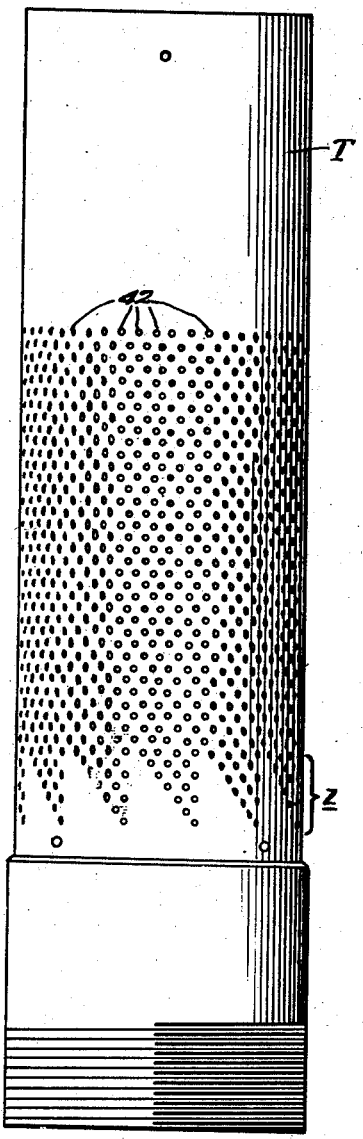
Inventor:
Clarence T. Kern, Patented Dec. 7, 1948

2,455,498

UNITED STATES PATENT OFFICE 2,455,498

STEAM INJECTION TYPE WATER HEATER

Clarence T. Kern, Milwaukee, Wis., assignor to Pick Manufacturing Company, West Bend, Wis., a corporation of Delaware Application January 11, 1945, Serial No. 572,369

13 Claims. (Cl. 261—36)

In the past many ways have been tried for the heating of water by the direct injection of steam. When a large capacity steam boiler is already available for other purposes, the use of steam becomes especially convenient as a medium for heating water. The method which is most efficient for heating water by steam is by injecting the steam into the water at the time when the hot water is required. This avoids loss of heat during storage—an expensive loss when it is necessary to have available a relatively large volume of hot water for supplying occasional large demands.

The instantaneous heating of water flowing through a conduit by the injection of steam thereinto has involved difficulties many of which remain unsolved. According to the preferred form of this invention, a number of inventive features contribute toward a satisfactory solution of all such difficulties.

One of the important features concerns stability of the steam injector action. This is complicated by the fact that the amount of steam injected may vary over wide ranges, depending on the volume of the water being heated and on the temperature to which it is to be raised. A stable injection action is more or less essential in order to avoid vibrations and noises which are always obnoxious and possibly even dangerous to the equipment. Injection is possible only when the amount of steam injected creates within the injector a steam pressure in excess of the prevailing water pressure. When the water pressure equals or exceeds the steam pressure momentarily, injection is halted and pressure equilibrium is created. Alternating surges of steam and water pressure then occur, producing more or less violent shock, vibration, hammering and noise. By reducing either the range of temperature rise through which the water is heated, or the volume of water, or both, the amount of steam required may be reduced below the natural point of inherent stability of the steam injector, causing pressure equilibrium and loss of control, such as to limit sharply the useful range and capacity of the heater.

According to my invention as herein disclosed, a contribution towards stability is the provision of an automatic control device which includes an injector formed with multitudinous orifices through which the steam issues into the water in the form of tiny jets which will condense without any opportunity to merge with one another. On the inside of the injector I provide an automatic pressure regulating piston which acts to restrict the effective area of the injector. This is accomplished by shutting off a varying proportion of the orifices in order to maintain a satisfactory minimum steam pressure within the injector. When steam is being supplied in substantial quantities, the piston yields to increase the effective area of the injector and open more orifices, as required.

Immediately ahead of the injector for a short distance the steam conduit is surrounded by a cool body of water which will cause condensation therewithin to take place; at this point the conduit is filled with balls to impart certain desirable flow characteristics to the steam, to reduce the volume of steam which will be suddenly condensed upon shutting off the flow of steam, and to reduce the quantity of water that must be ejected when steam is again supplied.

The conduit surrounding the injector is provided with helically extending vanes to produce an effective movement of the water, and lengthen its travel along the tube. Furthermore, the entire unit is designed to co-operate toward this end, as will hereinafter appear. Where the volume of water to be drawn is subject to variations, it is desirable to provide a forced recirculation system which will assure under all conditions an adequate flow of water to wipe past the steam jets and thereby prevent an accumulation of uncondensed steam.

Additional objects and advantages of my invention will be apparent from the further description and from the drawings in which;

Fig. 2 is a central vertical sectional view through the injector unit; and

Fig. 3 is an elevational view, on a larger scale, of the injector tube seen in Fig. 2.

Figure 1:
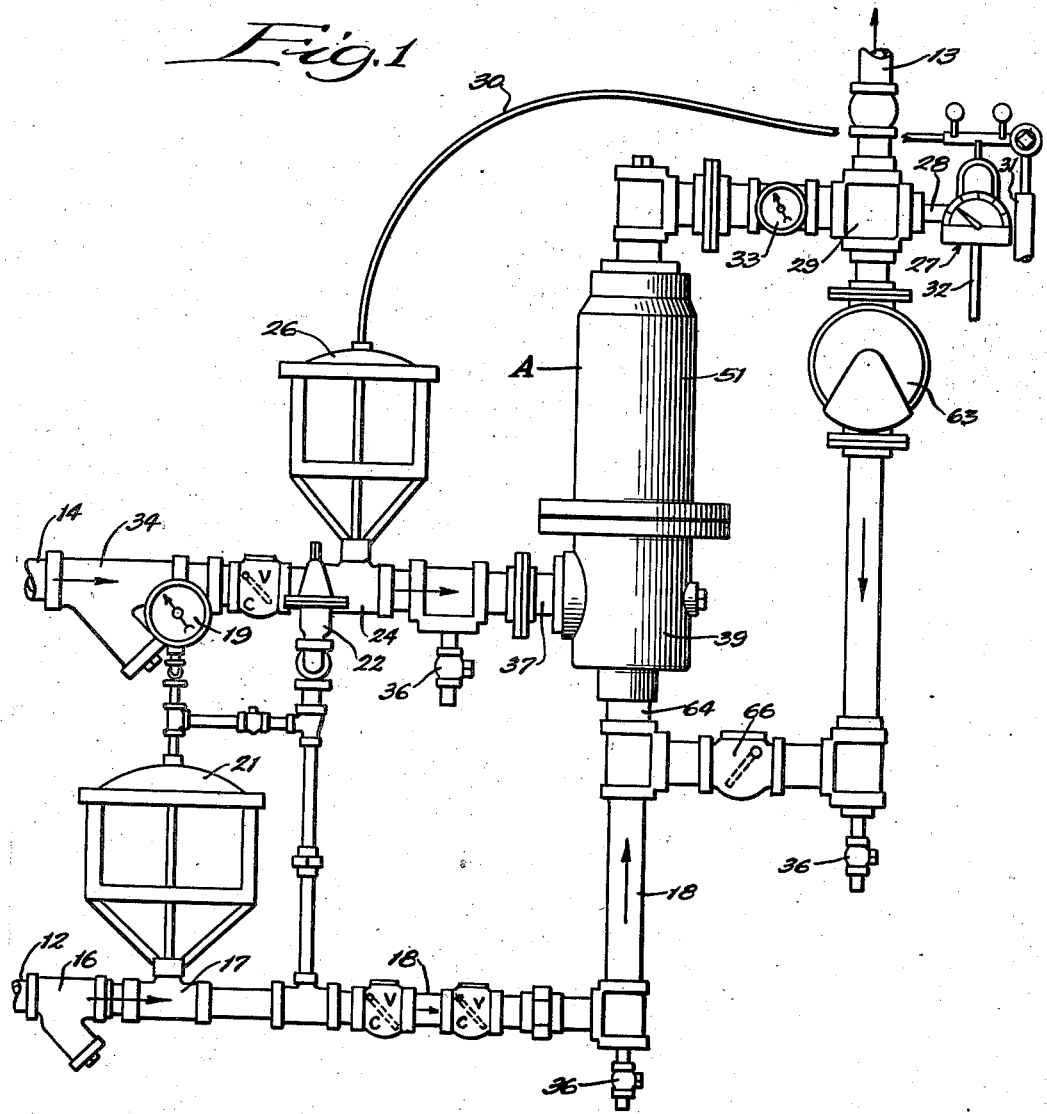
Figure 1 is a somewhat diagrammatic elevational view of the preferred form of the apparatus chosen for illustration.

Although the invention is disclosed in detail in accordance with the patent statutes, it will be understood that other ways will no doubt be found to utilize one or more of the inventive concepts, and it is my purpose and desire that these all be included within the present patent.

The steam and water system

In the apparatus herein illustrated, water is supplied to the heater A from a cold water supply pipe 12, and drawn off through a hot water delivery pipe 13. Steam is supplied through a steam supply pipe 14 equipped with a check valve to prevent reverse flow.

From the supply pipe 12 the water flows first through a strainer 16 and then through a pressure regulating valve 17 which maintains the water in the inlet pipe 18 at a constant pressure, of say 20 pounds, a constant pressure being desirable for the satisfactory operation of the invention. Reversal of flow through the inlet pipe is prevented by interposed check valves, as shown. The pressure may be indicated by a gauge 19. The regulating valve 17 is controlled by a diaphragm unit 21 in conjunction with a suitable spring (not shown). A relief valve 22 may also be provided. The amount of water flowing through the inlet pipe 18 will depend on the demand therefor, and oftentimes will fluctuate, more or less constantly, from zero to the maximum for which the system is designed.

It is desirable that the heated water discharged through the pipe 13 be of constant temperature regardless of the quantity demanded. This is accomplished by regulating the flow of steam as by means of a control valve 24 which is controlled by a diaphragm unit 26 in conjunction with a suitable spring (not shown). The pressure supplied to the diaphragm unit 26 may be controlled as by a thermostatic device indicated in its entirety by the reference numeral 27. This device in turn is controlled by a thermal element 28 which projects into the conduit 29. Pressure for operating the diaphragm unit 26 is supplied through a copper tubing 30 by the thermostatic device 27 which applies pressure from the pipe 31, or relieves the pressure therefrom, by connection with a pipe 32, in accordance with the temperature of the water in the conduit 29. The water temperature may be also indicated by a thermometer 33. The steam is preferably required to pass through a strainer 34, also a check valve, and drain cocks 36 may be provided at various points as illustrated.

The steam injector

The steam upon passing through the valve 24 is admitted into the heater A through an entering pipe 37 as seen in Fig. 2. This connects with a conduit here shown as an elbow 38 which may be cast integrally as part of the base portion 39 of the heater. The other end of the elbow carries an injector in the form of a tube T which may be threaded to the elbow, as shown. The injector tube, seen best in Figs. 2 and 3, is formed with a multitude of small orifices 42 (see Fig. 3) which may be opened to the flow of steam. These orifices which are prearranged as to spacing may have a slight inclination in the direction of the water flow so that the jets of steam issuing therethrough will assist in the circulation of the water.

Orifice control

A piston P operates within the injector tube, being urged downwardly by a spring 44 and being limited in its downward movement by a suitable stop (or stops) 46 secured to the injector tube as by riveting. The piston P may be in the form of an elongated cup, as illustrated. It preferably does not have an extremely close fit with the surrounding injector tube T. A clearance around the piston of .010" has been found satisfactory. The steam passing into this clearance probably escapes through the surrounding orifices or is condensed by the adjacent water and confining surfaces therefor. The piston is urged toward the stop 46 by the helical spring 44 one end of which abuts a ring 48 which in turn may bear against stop members 49, as clearly seen in Fig. 2.

Helical vanes

The injector tube T is surrounded by a casing 51 which is sealed to the base portion 39 of the heater. The casing is provided internally with helically extending guides such as vanes 52. Vanes of substantially the shape and proportions illustrated have been found to be satisfactory. The purpose of the vanes is to provide a better and further circulation of the water adjacent the injector. To the extent that the vanes cause the water to follow a helical path, they elongate the path and hence increase the speed of movement of the water. In addition, it is probable that the vanes superimpose a multitude of small eddy currents on the main spiral flow so that the water adjacent the injector tube at one instant is quickly intermixed with the remaining water.

Steam passage

The elbow 38 is preferably filled with steel balls 56, as illustrated in Fig. 2. The balls are retained in this space by screens or grids 57 and 58 positioned at opposite ends of the elbow. The grid 58 may be carried upon a collar 59 that is secured to the stop 46. The balls serve several important functions. They break up the flow of steam from the entering pipe 37 so that the striking force of the steam against the piston 43 is not localized in a concentrated, high-velocity stream. Such a stream would tend to cause unequal disposition of steam pressure around the injector tube T with the result that excessive steam might be forced through some of the orifices 42.

Disposition of orifices

The orifices within the zone z (see Fig. 3) are progressively reduced in number in a downward direction. Thus, with the piston in one extreme position, as shown in Fig. 2, a minimum number of orifices, say one dozen, is exposed. It is desirable to have some minimum flow area always open to ensure against chattering of the piston which might occur at a very low flow of steam, just enough to build up sufficient pressure to move the piston, the pressure being immediately released whenever the piston movement starts. These few orifices which remain always open, together with the annular clearance around the piston, will accommodate a very appreciable flow of steam. As a matter of fact, it is probable that a small quantity of steam flowing into the elbow 38 will not emerge as steam therefrom because heat transfer through the walls of the elbow 38 is sufficiently effective to condense some of the steam within the elbow. When the flow of steam is more than can be accommodated by its condensation within the elbow, by its passage through the few always-open orifices, and by its flowing through the annular clearance around the piston, the steam pressure will act to push the piston upwardly. A very little movement will suffice to expose additional orifices which, as shown, may be conveniently arranged in rows. A little further piston movement will expose still another orifice row, the number of orifices exposed with upward movement of the piston being progressively increased throughout the zone z and steadily therebeyond.

Recirculation

To have a stable injector action, the water should flow across the discharge face of each orifice fast enough to condense the issuing jet of steam before it merges with other jets to form large bubbles. The orifices are large enough so that with maximum demand enough steam will be injected to satisfy the heating requirements. With less demand the piston P will close off more of the orifices, such a condition occurring when the steam pressure against the piston is being reduced. There is accordingly some reduction in the rate of flow of steam through the orifices which remain open. Accordingly the water need not travel across the discharge face of these orifices as fast as before in order to condense the jets and prevent their merging. It has been found, however, that under some conditions the movement of heated water, in response to the demand therefor, is not adequate to condense the steam jets and stabilize the thermostatic control. Accordingly it may be desirable to provide means for recirculating the water to maintain the flow in installations where such conditions arise.

As seen in Fig. 1, I may employ an electrically driven centrifugal pump 63 having its inlet connected to the discharge pipe 29, and discharging into an intake pipe 64. The characteristics of the pump 63 and its drive are such that when the flow of water through the heater A, in response to demand, falls below a predetermined value, the pressure produced by the pump 63 will cause water to flow downwardly therethrough so as to increase the flow of water through the heater thereby maintaining a sufficient flow therethrough to ensure stable injection action. Flow in the reverse direction through the pump 63 is prevented by a check-valve 66.

*Operation*

When water is caused to flow through the delivery pipe 13 by turning a faucet or valve at some remote point, water flows through the injection chamber c within the casing 51 of the heater the water being supplied thereto under a constant pressure which is assured by the pressure-regulating valve 17. The flow of cold water through the heater reduces the temperature of the water in the conduit 29 so that the thermal unit 28 activates the thermosat 27 to operate the steam control valve 24 to admit steam through the entering pipe 37 to the injection tube. If there be any water in the elbow 38, it will be ejected by the initial force of the entering steam. If a large volume of steam is required to heat the amount of water being drawn to the temperature at which the thermostat is set, sufficient steam is admitted by the control valve 24 to build up a sufficient steam pressure below the piston P whereby to advance it upwardly against the spring 44 to expose enough orifices 42 for the required amount of steam to be injected in a multitude of fine jets into the water. The water will circulate at a speed sufficient to absorb these jets without giving them a chance to merge with one another to form large steam bubbles, this circulation either resulting from the demand in the delivery pipe 13, or being forced by the recirculation which is produced by the pump 63.

Although the dimensions and characteristics may be varied considerably, the difficulty ordinarily encountered in any attempt to utilize the steam injection principle is such that it may be helpful to here set forth some of the factual data which experience has established to be satisfactory for operation of the present heater. The dimensions chosen are for a heater designed to supply 50 gallons of water per minute. For other sizes the proportions may be changed to provide the same rate of flow.

For the size indicated, the internal diameter of the casing 51 may be 6", and its over-all length may be 14¾". The exposed length of the injector tube beyond the elbow is about 10⅝". The elbow 38 may be constructed for connection with a 3" pipe at each end, the inside dimension of the elbow at its ends being 3 1/16". The base portion 39 which may have an overall length of 10 13/16" may be provided with an opening for a 2" pipe. A larger opening is preferred for the outlet from the casing 51, a 4" pipe at this point having been found satisfactory. The injection orifices are about .055" in diameter. They slant at an angle of about 17° upwardly and outwardly from the horizontal. The balls of 1¼" diameter will occupy about 66% of the space in the elbow. The drawings, especially Figs. 2 and 3 are drawn approximately to scale so that other approximate dimensions may be determined. The spring characteristics may be varied according to requirements. With the dimensions given it is preferred to have the spring pressure such that the piston P will move away from its stop 46 when the steam pressure within the injector tube reaches a pressure of .64 lb. per square inch above the pressure of the surrounding water. The steam velocity through the orifices will then be approximately 6000 feet per minute.

One of the first requisites to accomplish proper operation of a heater of this type (direct steam injection) is to immediately condense the steam as it issues from each orifice. Steam from one orifice must not be permitted to combine with that from one or more other orifices into a quantity of uncondensed steam that will move into a zone of somewhat cooler water and then immediately collapse, causing hammering, vibration and bumping noises. To effect immediate condensing of the steam from and at such orifices, in addition to correctly proportioning the diameter of the orifice itself and thus the quantity of steam discharged through it, water circulation through the heater is of the utmost importance.

It is important that the circulation of water be adequate past all the orifices. In accomplishing this with the structure illustrated, it has been found desirable to have it vertically disposed as shown. This aids in obtaining uniformity of circulation about the orifices at different parts of the tube. To obtain a sufficiently rapid movement of the water in helical vanes and the pump are provided. The pump supplements circulation due to the flow of primary water, and the vanes make it more effective.

If a heater were to always operate at full rated capacity in G. P. M.—a 50 gallon heater at 50 G. P. M., a 100 gallon heater at 100 G. P. M., etc.— no pump would be required. The flow of the primary water—50 G. P. M., 100 G. P. M., etc., would constitute ample circulation within the heater casing.

That continues to hold true even though the primary water flow through the heater be reduced to about 66⅔% of its maximum water capacity. Below that approximate point, circulation due to the primary water alone becomes inadequate. The pump is planned to circulate approximately that quantity of water—66⅔% of the maximum G. P. M. rating of the heater, thus maintaining adequate circulation of water through the heater casing and over the steam orifices regardless of how much be the reduction in the quantity of primary water flowing through the heater. When a small quantity of primary cold water enters the heater to become mixed with the hot water already there, the process of mixing or blending is not accomplished nearly as well without a pump. This imperfect mixing has a detrimental effect upon the operation of the thermostat because water coming into contact with it is not properly mixed to an even temperature—it is stratified. At this point a pump is very beneficial, as it stabilizes the control function of the thermostat.

From the foregoing it is seen that a thoroughly reliable instantaneous water heater of the steam injection type has been provided, and one which performs quietly and uniformly under various conditions.

I claim:

1. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifices, a water inlet communicating with the lower end of the injection chamber for the introduction of water into the same, a hot water outlet communicating with the upper end of the injection chamber, and means connected with the injection chamber and having a circulation capacity less than the hot water outlet for re-circulating the heated water through the injection chamber for increasing flow through the injection chamber when the hot water demand falls below a predetermined quantity and the steam delivered to the injection chamber is correspondingly reduced.

2. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifies, a water inlet communicating with the lower end of the injection chamber for the introduction of water into the same, a hot water outlet communicating with the upper end of the injection chamber, and means connected with the hot water outlet and the water inlet having a circulation capacity less than the hot water outlet for re-circulating the heated water through the injection chamber from one end of the same to the other end thereof for increasing flow through the injection chamber when the hot water demand falls below a predetermined quantity and the steam delivered to the injection chamber is correspondingly reduced.

3. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifices, a water inlet communicating with the lower end of the injection chamber for the introduction of water into the same, a hot water outlet communicating with the upper end of the injection chamber, and a re-circulation pump having an intake and discharge connected, respectively with said hot water outlet and the water inlet and having a circulation capacity less than the hot water outlet for re-circulation of water through the injection chamber and past the steam jets for increasing flow through the injection chamber when the hot water demand falls below a predetermined quantity and the steam delivered to the injection chamber is correspondingly reduced.

4. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open sucessively more of the orifices, a water inlet communicating with the lower end of the injection chamber for the introduction of water into the same, a hot water outlet communicating with the upper end of the injection chamber, and means for limiting the shut-off movement of the piston before all of the orifices are closed.

5. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifices, a water inlet communicating with the lower end of the injection chamber for the introduction of water into the same, and a hot water outlet communicating with the upper end of the injection chamber, said injector tube having some flow area for the injection of steam located beyond movement range of the piston when in its extreme position in the shut-off direction.

6. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifices, the distribution of the orifices being such that upon movement of the piston in the opening direction fewer orifices are opened by the initial movement than by a subsequent equal movement in the same direction, a water inlet communicating with the lower end of the injection chamber for the introduction of water into the same, and a hot water outlet communicating with the upper end of the injection chamber.

7. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, means for automatically regulating the flow of steam to supply the amount of steam required to accomplish the desired heating of the water, a piston within the tube adapted to move along the tube and open a variable number of the orifices, resilient means urging the piston in a direction to shut off more of the orifices, said piston being yieldable in response to increases in steam pressure to open successively more of the orifices, a water inlet communicating with the lower end of the injection chamber for the introduction of water into the same, a hot water outlet communicating with the upper end of the injection chamber, and means connected with the injection chamber and having a circulation capacity for re-circulating the heated water through the injection chamber for increasing flow through the injection chamber when the hot water demand falls below a predetermined quantity and the steam delivered to the injection chamber is correspondingly reduced.

8. A steam injection type water heater including an upright casing, an injector tube arranged within and extending longitudinally of the casing in spaced relation with the walls thereof to form an injection chamber for the passage of water to be heated, said tube being provided with orifices arranged to inject jets of steam into water passing through the injection chamber, means including a conduit connected to the lower end of the injector tube for introducing steam into the injector tube and for automatically regulating the flow of the steam to supply the amount of steam required to accomplish the desired heating of the water, a water inlet communicating with the injection chamber, a hot water outlet for the discharge of heated water from the injection chamber, and a re-circulation pump connected with the hot water outlet and the water inlet having a circulation capacity less than the hot water outlet and adapted to re-circulate water through the injection chamber for increasing flow through said chamber when the flow of water past the injector tube in response to demand falls below a predetermined quantity and the delivery of steam to the injector tube is correspondingly reduced.

9. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, means including a conduit connected to the lower end of the injector tube for supplying steam internally of the tube, a piston within the tube adapted to move along the tube and open a variable number of the orifices, resilient means urging the piston in a direction to shut off more of the orifices, said piston being yieldable in response to increases in steam pressure to open successively more of the orifices, a water inlet communicating with the lower end of the injection chamber for the introduction of water into the same, a hot water outlet communicating with the upper end of the injection chamber, and re-circulating means connected with the injection chamber and having a circulation capacity less than the hot water outlet for increasing flow through the circulation chamber when the hot water demand falls below a predetermined quantity and the steam delivered to the injection chamber is correspondingly reduced.

10. A steam injection type water heater including an upright casing, an injector tube arranged within the casing and extending along the same in spaced relation with the walls of the casing to form an intervening injection chamber and having a multitude of orifices for discharging jets of steam into water passing through the injection chamber, a water inlet communicating with the lower end of the injection chamber for introducing water into the same, a hot water outlet communicating with the upper end of the injection chamber, means including a conduit connected with the lower end of the injector tube for introducing steam into the injector tube and for automatically regulating the flow of steam required to accomplish the desired heating of the water, a piston within the tube adapted to move along the same and open a variable number of the orifices, resilient means urging the piston in a direction to shut off more of said orifices, said piston being yieldable in response to increases in steam pressure to open successively more of the orifices, and forced re-circulation means having a circulation capacity less than the hot water outlet for increasing flow through the injection chamber and effective when the flow of water past the injector tube in response to demand passes below a predetermined value to supplement said flow to maintain sufficient circulation of water past the injector tube to prevent the merging of the separate steam jets issuing through said orifices and thereby insure stability of the injector action.

11. A steam injection type water heater including an upright casing, an injector tube arranged within and extending longitudinally of the casing in spaced relation with the walls of the casing to form an intervening injection chamber and provided with a multitude of orifices for discharging jets of steam into the injection chamber, a water inlet communicating with the lower end of the injection chamber for introducing water into the same, a hot water outlet communicating with the upper end of the injection chamber, means including a conduit connected with the lower end of the injector tube and extending into the casing at a point above the water inlet for supplying steam internally of the tube, the upper end of the injector tube being in open communication with the injection chamber, means for automatically regulating the flow of the steam to supply the amount of steam required to accomplish the desired heating of the water, a piston within the tube adapted to move along the same and open a variable number of orifices, resilient means for urging the piston in a direction to shut off more of the orifices, said piston being yieldable in response to increases in steam pressure to open successively more of the orifices, a plurality of balls restrained in the steam conduit below the piston and reducing the capacity of the steam conduit and arranged to break up the flow of steam before it strikes the piston to prevent localized impact of steam against the piston, said balls also reducing the volume of steam condensed within said conduit when flow of steam is shut off and lessening the volume of water to be ejected from the steam conduit when the steam is again supplied, thereby increasing rapidity of operation.

12. A steam injection type water heater including a casing, an injector tube arranged within the casing and extending longitudinally of the casing in spaced relation with the walls of the casing to form an intervening injection chamber and provided with a multitude of orifices for discharging jets of steam into the injection chamber, means including a conduit connected to the injection tube at one end thereof for supplying steam internally of the tube, a piston within the tube adapted to move along the tube and open a variable number of orifices, resilient means urging the piston in a direction to shut off more of the orifices, said piston being yieldable in response to increases in steam pressure to open successively more of the orifices, a water inlet communicating with one end of the injection chamber for the introduction of water into the same, a hot water outlet communicating with the other end of the injection chamber, means for automatically regulating the flow of the steam to supply the amount of steam required to accomplish the desired heating of the water, and a plurality of balls restrained in the steam conduit and reducing the capacity of the steam conduit and arranged to break up the flow of steam before it strikes the piston to prevent localized impact of steam against the piston, said balls also reducing the volume of steam condensed within the conduit when flow of steam is shut off and lessening the volume of water to be ejected from the steam conduit when the steam is again supplied, thereby increasing rapidity of operation.

13. A steam injection type water heater including a casing, an injector tube arranged within the casing and extending longitudinally of the casing in spaced relation with the walls of the casing to form an intervening injection chamber and provided with a multitude of orifices for discharging jets of steam into the injection chamber, means including a conduit connected to the injection tube at one end thereof for supplying steam internally of the tube, a piston within the tube adapted to move along the tube and open a variable number of orifices, resilient means urging the piston in a direction to shut off more of the orifices, said piston being yieldable in response to increases in steam pressure to open successively more of the orifices, a water inlet communicating with one end of the injection chamber for the introduction of water into the same, a hot water outlet communicating with the other end of the injection chamber, means for automatically regulating the flow of the steam to supply the amount of steam required to accomplish the desired heating of the water, and recirculating means connected with the injection chamber and having a circulation capacity less than the hot water outlet for increasing flow through the circulation chamber when the hot water demand falls below a predetermined quantity and the steam delivered to the injection chamber is correspondingly reduced.

CLARENCE T. KERN.

REFERENCES CITED

The following references are of record in the file of this patent:

UNITED STATES PATENTS

| Number | Name | Date |
| --- | --- | --- |
| 427,193 | Schutte | May 6, 1890 |
| 1,018,083 | Schwarz | Feb. 20, 1912 |
| 1,143,162 | Armstrong | June 15, 1915 |
| 1,158,231 | Kerr | Oct. 26, 1915 |
| 1,273,106 | Gardiner | July 16, 1918 |
| 1,806,394 | Giessler et al. | May 19, 1934 |
| 1,969,644 | Gavett | Aug. 7, 1934 |
| 2,094,664 | Monahan | Oct. 5, 1937 |
| 2,172,420 | Tweed | Sept. 12, 1939 |
| 2,212,288 | Decker | Aug. 20, 1940 |
| 2,308,721 | Sebald | Jan. 19, 1943 |
| 2,335,250 | Adlam | Nov. 30, 1943 |
| 2,360,900 | Setterwall | Oct. 24, 1944 |
| 2,372,533 | Torbett | Mar. 27, 1945 |

FOREIGN PATENTS

| Number | Country | Date |
| --- | --- | --- |
| 538,973 | France | June 17, 1922 |